Jan. 20, 1948.  R. S. COLLEY  2,434,835
VARIABLE FLUID PASSAGE
Filed May 4, 1946
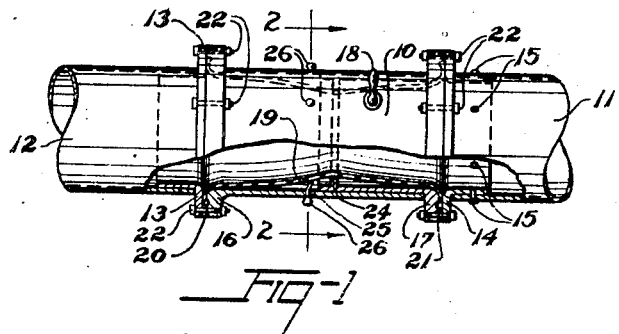
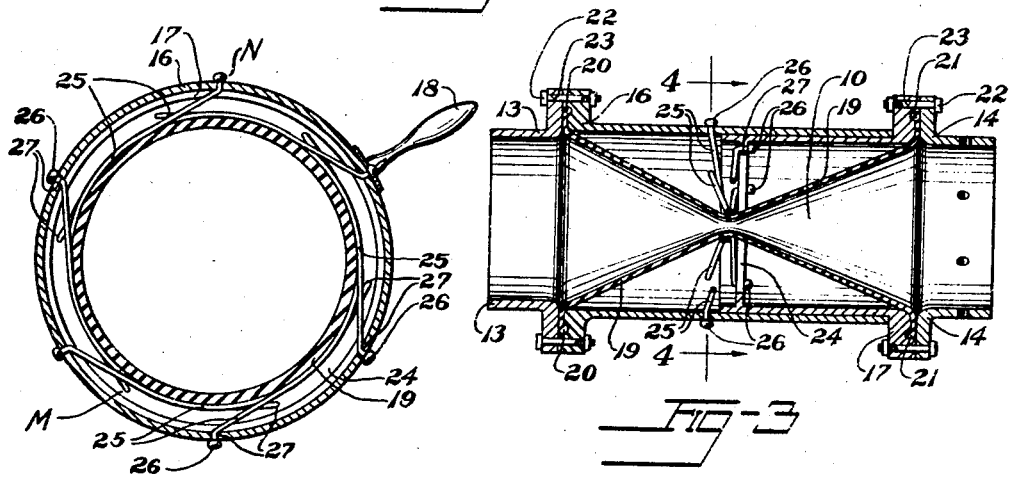
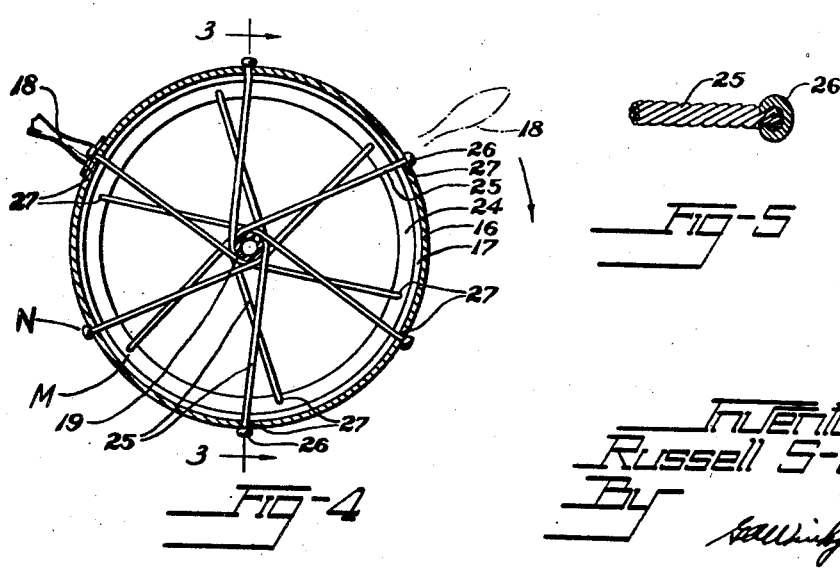
Inventor
Russell S. Colley Patented Jan. 20, 1948

2,434,835

UNITED STATES PATENT OFFICE 2,434,835

VARIABLE FLUID PASSAGE

Russell S. Colley, Kent, Ohio, assignor to The B. F. Goodrich Company, New York, N. Y., a corporation of New York Application May 4, 1946, Serial No. 667,339

8 Claims. (Cl. 138—45)

This invention relates to apparatus for the passage of fluid and especially to Venturi tubes where it is desirable to provide means for varying the throat area thereof.

Objects of the invention are to provide for improved regulation of the flow of fluids in a passage; to provide for facilitating flow of fluid; to provide for adjustability of the throat area of the passage throughout a wide range; and to provide simplicity of construction, convenience of manufacture and effectiveness of operation.

A further object is to provide a Venturi tube with an improved arrangement for varying the throat area thereof.

Referring to the drawings:

Fig. 1 is an elevation of apparatus constructed in accordance with and embodying the invention, parts being broken away.

Fig. 2 is a section taken along line 2—2 of Fig. 1 showing the Venturi throat in the open position.

Fig. 3 is a longitudinal section of the apparatus shown in Fig. 1 taken along the line 3—3 in Fig. 4.

Fig. 4 is a section taken along the line 4—4 in Fig. 3 showing the Venturi throat in a partially contracted position.

Fig. 5 is a detail view on an enlarged scale of one of the adjusting elements, parts being sectioned and broken away.

In accordance with the invention a fluid passage is provided consisting of an annular throat formed of a resilient material such as rubber or other rubber-like material, which may be in sheet form, adapted to be inserted and held as a tubular liner in a sleeve structure and to provide a passage of maximum area therethrough, special mechanism being provided to contract the liner adjustably for reducing the passage throat area therein. The reduction of the throat area of the passage in the illustrated embodiment of the invention is accomplished by the restricting action upon the liner of a system of elements fastened to two sleeve members, one of which is rotatable with relation to the other.

With reference to the drawings a throat section 10 is mounted between two sections of conduit 11 and 12. Two flanged collars 13 and 14 of the throat section 10 are mounted telescopically in the sections of conduit 11 and 12. Both the flanged collars 13 and 14 may be fixedly mounted as with rivets to the conduit sections 11 and 12. However, it is preferred that one flanged collar 13 shall be rotatable with relation to the adjacent section of conduit 12 as will be hereinafter discussed, the other collar 14 being riveted to the conduit section 11 as at 15. The flanged collars 13 and 14 are mounted with flanges thereof abutting the flanges of two telescopically connected flanged sleeves, 16 and 17 so that the flange of the outer sleeve 16 abuts the movable collar 13 and the flange of the inner sleeve 17 abuts the fixed collar 14. A handle 18 mounted on the outer sleeve wall 16 facilitates rotation of the outer sleeve 16 about the inner sleeve 17. A tubular lining 19 is inserted in the sleeves 16 and 17 and may have beaded end edges 20 and 21 which are clamped between the flanges of the sleeves 16 and 17 and the collars 13 and 14, respectively, as by bolts 22 passing through holes 23 in the flanges. The inner sleeve 17 is shorter in length than the outer sleeve 16 and has an inner rim 24.

To contract the lining, restricting elements of flexible strip material, such as cables 25, are used. The cables 25 are placed between the lining and sleeves at circumferentially spaced-apart positions and are mounted so that relative rotation of the sleeves 16 and 17 causes the cables 25 to converge centrally. To attain these results each cable 25 is secured at one end to the inner sleeve rim 24 and at the other end to the outer sleeve 16 wall. Metal knobs 26 clamped to the ends of the cables 25 as shown in Fig. 5 hold the cables 25 in the holes 27 in the inner sleeve rim 24 and outer sleeve wall 16.

Each cable extends through a part circumference of the structure as will be seen in Fig. 2 and Fig. 4 wherein one of the cables 25 has an end secured to the inner rim 24 at M and an opposite end secured to the outer sleeve 16 at a position N. In the movement of the parts from the position of Fig. 2 to the position of Fig. 4 the first-mentioned end at M remains in the same position while the other end is shifted to the position N in Fig. 4. The other cables 25 each extending part way about the lining, all shift correspondingly.

The relative rotation of the sleeves 16 and 17 which takes place in the operation of the illustrated embodiment of the invention necessitates the relative rotation of the collars 13 and 14 fixedly mounted on the sleeves. If both the collars 13 and 14 were fixedly mounted to the sections of conduit 11 and 12, provision for the relative rotation of the sections of conduits 12 and 13 would be necessary. Since relative movement of the sections of conduit 11 and 12 is undesirable in many installations, preferably only one collar 14 is fixedly mounted to the conduit section 11, the other collar 13 being mounted rotatably in the section 12.

To obtain different Venturi shapes the cables 25 may be disposed at points other than in the longitudinal center region of the throat section 10, and if desired the lengths of the cables 25 may be varied. When the cables 25 are of the same length and mounted similarly the contracted orifice resulting from the relative rotation of the sleeves 16 and 17 will tend to be coaxial with the axes of the sleeves 16 and 17. However, in some cases, if desired, the lengths of the cables 25 need not be the same in which cases the contracted orifice resulting from the rotation of the sleeves 16 and 17 will tend to be off center.

In Fig. 1 and Fig. 2 the disposition of the cables 25 and lining 19 at the maximum throat area position is shown. When the outer sleeve 16 is turned clockwise as shown in Fig. 2, as by means of the handle 18, one end of each cable 25 will move around the lining 19 causing the cables 25 to wrap around and urge the lining 19 away from the sleeve walls 16 and 17. During this operation one lining edge 20 will rotate relative to the other 21 thereby stretching and twisting the lining 19. This action of the lining 19 plus the stretching caused by the increase in length of the lining 19 as the throat area is decreased will tend to reduce the wall thickness and compensate, in part at least, for the tendency of the wall to increase in thickness as a result of the reduction in cross-section of the tube, thus minimizing or avoiding objectionable wrinkling.

From the position of maximum throat area as shown in Fig. 1 and Fig. 2 the throat area may be reduced and finally fully contracted by turning the outer sleeve 16 clockwise as viewed in Fig. 2. Conversely the throat area may be increased from the fully contracted position by turning the outer sleeve 16 in the counterclockwise direction which will cause the cables 25 to unwind from the lining 19 and the lining 19 twist to be reduced. When these deforming forces acting on the lining 19 are diminished the resiliency of the lining 19 material will act to return it to the normal condition at the maximum throat area position. It is evident from the above description that any intermediate throat area may be attained between the maximum throat area position and the fully contracted position by turning the outer sleeve 16 an amount less than that required to change from full contraction to maximum area of the throat, and in all positions of adjustment, the stressed resilient sleeve provides a continuous surface of the passage, both longitudinally and circumferentially.

Variations may be made without departing from the scope of the invention as it is defined by the following claims.

I claim:

1. A fluid passage comprising a pair of relatively movable sleeves, a flexible lining mounted in said sleeves, and means for moving a portion of said lining to change the area of the passage, said means comprising a plurality of elements at the outside of said lining, each element being secured to both said relatively movable sleeves.

2. A fluid passage comprising a pair of relatively movable sleeves, a resilient lining mounted in said sleeves, and means for advancing a portion of said lining toward an opposite portion of the passage to reduce the area of the passage, said means comprising a plurality of elements at the outside of said lining, each element being secured to both said relatively movable sleeves.

3. A fluid passage comprising a pair of relatively rotatable sleeves, a resilient lining mounted in said sleeves, and means for advancing a portion of said lining toward an opposite portion of the passage to reduce the area of the passage, said means comprising a plurality of elements at the outside of said lining, each element being secured to both said relatively rotatable sleeves.

4. A fluid passage comprising a pair of relatively rotatable sleeves, a tubular resilient lining in said sleeves secured at longitudinally spaced-apart positions to both said sleeves, and means for advancing an intermediate portion of said lining toward an opposite portion of the passage, said means to reduce the area of the passage, said means comprising a plurality of elements at the outside of said lining, each element being secured to both said rotatable sleeves.

5. A fluid passage comprising a pair of relatively rotatable sleeves mounted in telescopic relation, a tubular resilient lining mounted in said sleeves and means for advancing a portion of said lining toward an opposite portion thereof to reduce the area of the passage, said means comprising a plurality of elongated flexible elements disposed at the outside of said lining and secured to both said rotatable sleeves.

6. A fluid passage comprising a pair of relatively rotatable telescopically associated sleeves, a resilient lining mounted at longitudinally spaced-apart positions in both said sleeves and means for advancing a portion of said lining toward an opposite portion thereof to reduce the area of the passage, said means comprising a plurality of flexible strip elements attached to both sleeves at circumferentially spaced-apart positions embracing the lining to effect constriction of said elements and reduction of the area of said passage upon relative rotation of said sleeves.

7. A variable fluid passage for sections of conduit comprising a pair of relatively rotatable telescopically associated sleeves, means for mounting said sleeves in said sections of conduit for relative rotation of one of said sleeves with respect to a section of the conduit, a resilient lining secured at longitudinally spaced-apart positions to both said sleeves and means for adjusting said lining to various degrees of convergence, said means comprising a plurality of flexible strip elements secured to both said sleeves at circumferentially spaced-apart positions and embracing the lining to effect constriction of said elements and reduction of the area of said passage upon relative rotation of said sleeves.

8. A variable fluid passage for sections of conduit, said passage comprising a pair of sleeves each flanged at one end thereof and fitting one within the other with the inner sleeve terminating short of the flanged end of the outer sleeve and having an inner rim thereon, flanged collars for mounting the flanged sleeves on sections of conduit such that the flanges of the collars abut the flanged ends of the sleeves, a tubular resilient lining with beaded end edges clamped between the flanged ends of said sleeves and the flanges of said collars, and a plurality of cable elements embracing said lining, said cable elements having enlarged ends, said outer sleeve and said rim of the inner sleeve having apertures at circumferentially spaced-apart positions in which the ends of said cable elements are held to effect constriction of said cable elements upon said lining upon relative rotation of said sleeve in one direction and release of said constriction upon relative rotation of said sleeves in the opposite direction.

RUSSELL S. COLLEY.

REFERENCES CITED

The following references are of record in the file of this patent:

UNITED STATES PATENTS

| Number | Name | Date |
| --- | --- | --- |
| 977,044 | Rebourg | Nov. 29, 1910 |
| 2,409,433 | Hunter | Oct. 15, 1946 |

FOREIGN PATENTS

| Number | Country | Date |
| --- | --- | --- |
| 16,321 | Great Britain | Aug. 1, 1908 |